(12) United States Patent
Hsu et al.

(10) Patent No.: US 12,085,745 B2
(45) Date of Patent: Sep. 10, 2024

(54) BACKLIGHT MODULE AND DISPLAY APPARATUS

(71) Applicants: Coretronic Optics (Suzhou) Co., Ltd., Jiangsu (CN); Coretronic Corporation, Hsin-Chu (TW)

(72) Inventors: Chun-Hsiang Hsu, Hsin-Chu (TW); Yen-Hao Lin, Hsin-Chu (TW); Wen-Pin Yang, Jiangsu (CN)

(73) Assignees: Coretronic Optics (Suzhou) Co., Ltd., Jiangsu (CN); Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/359,857

(22) Filed: Jul. 26, 2023

(65) Prior Publication Data

US 2024/0085613 A1    Mar. 14, 2024

(30) Foreign Application Priority Data

Sep. 8, 2022    (CN) .......................... 202222384881.4

(51) Int. Cl.
*F21V 8/00*    (2006.01)
(52) U.S. Cl.
CPC ......... *G02B 6/0053* (2013.01); *G02B 6/0051* (2013.01)

(58) Field of Classification Search
CPC .......................................... G02B 6/0051–0053
See application file for complete search history.

(56) References Cited

U.S. PATENT DOCUMENTS 9,081,190 B2 * 7/2015 Holman ............ G02F 1/133606
2016/0259115 A1   9/2016 Kitano et al.

FOREIGN PATENT DOCUMENTS

CN        102272667        12/2011

* cited by examiner

*Primary Examiner* — Jason M Han
(74) *Attorney, Agent, or Firm* — JCIPRNET

(57) ABSTRACT

A backlight module includes a light guide plate, a light source, a first prism sheet, and a second prism sheet. The light source is disposed on a light incident surface of the light guide plate. The first prism sheet is disposed on a side of a light exiting surface of the light guide plate and has multiple first prism structures facing the light guide plate. The second prism sheet has multiple second prism structures facing the light guide plate. An included angle between an extending direction of the first prism structures and an extending direction of the second prism structures is greater than or equal to 85 degrees and less than or equal to 95 degrees. An included angle between the extending direction of the second prism structures and the light incident surface is greater than or equal to 85 degrees and less than or equal to 95 degrees.

9 Claims, 7 Drawing Sheets

BACKLIGHT MODULE AND DISPLAY APPARATUS

CROSS-REFERENCE TO RELATED APPLICATION

This application claims the priority benefit of China application serial no. 202222384881.4, filed on Sep. 8, 2022. The entirety of the above-mentioned patent application is hereby incorporated by reference herein and made a part of this specification.

BACKGROUND

Technical Field

The disclosure relates to a display apparatus having a light source module, and particularly relates to a backlight module and a display apparatus.

Description of Related Art

With the increasing application of non-self-luminous displays such as liquid crystal displays, the design of the backlight module also needs to be adjusted for different purposes. In order to improve the light exiting luminance of the backlight module near the normal viewing angle, a structure of disposing two prism sheets on the light exiting surface of the light guide plate is proposed, in which the prism structures on these two prism sheets are disposed away from the light guide plate, and extend in two directions that are perpendicular to each other.

However, under such a structure, the backlight module has the light leakage phenomenon at large viewing angles, and the symmetry of the light emission type thereof with respect to the normal viewing angle is also poor. For example, the display apparatus has a significant variation of luminance as the viewing angle changes near the normal viewing angle, resulting in the visual variability of the display screen.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a backlight module, which has less light exiting luminance variation near the normal viewing angle and less stray light.

The disclosure provides a display apparatus whose visual variability near the normal viewing angle is less obvious.

Other purposes and advantages of the disclosure may be further understood from the disclosed technical characteristics of the disclosure.

In order to achieve one or part or all of the above purposes or other purposes, an embodiment of the disclosure proposes a backlight module. The backlight module includes a light guide plate, a light source, a first prism sheet, and a second prism sheet. The light guide plate has a light incident surface and a light exiting surface connected to the light incident surface. The light source is disposed on a side of the light incident surface of the light guide plate. The first prism sheet is disposed on a side of the light exiting surface of the light guide plate. The first prism sheet has a first substrate and multiple first prism structures. The first prism structures are disposed on a first surface of the first substrate facing the light guide plate. The second prism sheet is disposed between the first prism sheet and the light guide plate. The second prism sheet has a second substrate and multiple second prism structures. The second prism structures are disposed on a second surface of the second substrate facing the light guide plate. An included angle between an extending direction of the first prism structures and an extending direction of these second prism structures is greater than or equal to 85 degrees and less than or equal to 95 degrees. An included angle between the extending direction of these second prism structures of the second prism sheet and the light incident surface is greater than or equal to 85 degrees and less than or equal to 95 degrees.

In order to achieve one or part or all of the above purposes or other purposes, an embodiment of the disclosure proposes a display apparatus. The display apparatus includes a backlight module and a display panel. The backlight module includes a light guide plate, a light source, a first prism sheet, and a second prism sheet. The light guide plate has a light incident surface and a light exiting surface connected to the light incident surface. The light source is disposed on a side of the light incident surface of the light guide plate. The first prism sheet is disposed on a side of the light exiting surface of the light guide plate. The first prism sheet has a first substrate and multiple first prism structures. The first prism structures are disposed on a first surface of the first substrate facing the light guide plate. The second prism sheet is disposed between the first prism sheet and the light guide plate. The second prism sheet has a second substrate and multiple second prism structures. These second prism structures are disposed on a second surface of the second substrate facing the light guide plate. An included angle between an extending direction of the first prism structures and an extending direction of these second prism structures is greater than or equal to 85 degrees and less than or equal to 95 degrees. An included angle between the extending direction of these second prism structures of the second prism sheet and the light incident surface is greater than or equal to 85 degrees and less than or equal to 95 degrees. The display panel is disposed on a side of the first prism sheet away from the second prism sheet and overlaps the light exiting surface of the light guide plate.

Based on the above, in the backlight module and the display apparatus of an embodiment of the disclosure, the multiple first prism structures of the first prism sheet and the multiple second prism structures of the second prism sheet are disposed facing the light exiting surface of the light guide plate. The included angle between the extending direction of the first prism structure and the extending direction of the second prism structure is in the range of 85 degrees to 95 degrees. The included angle between the extending direction of the second prism structure between the first prism sheet and the light guide plate and the light incident surface is in the range of 85 degrees to 95 degrees. Accordingly, the light leakage phenomenon at large viewing angles can be suppressed, and the symmetry of the light emission type of the backlight module with respect to the normal viewing angle can be effectively improved. In addition, the light exiting luminance variation of the backlight module near the normal viewing angle is moderate, which helps to improve the visual variability of the display apparatus near the normal viewing angle, thereby improving the display quality.

Other objectives, features and advantages of the disclosure will be further understood from the further technological features disclosed by the embodiments of the disclosure wherein there are shown and described preferred embodiments of the disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the direction of the drawings being described. The components of the disclosure may be positioned in a number of different directions. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations herein is meant to encompass the items listed thereafter and equivalents thereof as well as additional items. Unless limited otherwise, the terms "connected," "coupled," and "mounted" and variations therein are used broadly and encompass direct and indirect connections, couplings, and mountings. Similarly, the terms "facing," "faces" and variations therein are used broadly and encompass direct and indirect facing, and "adjacent to" and variations therein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
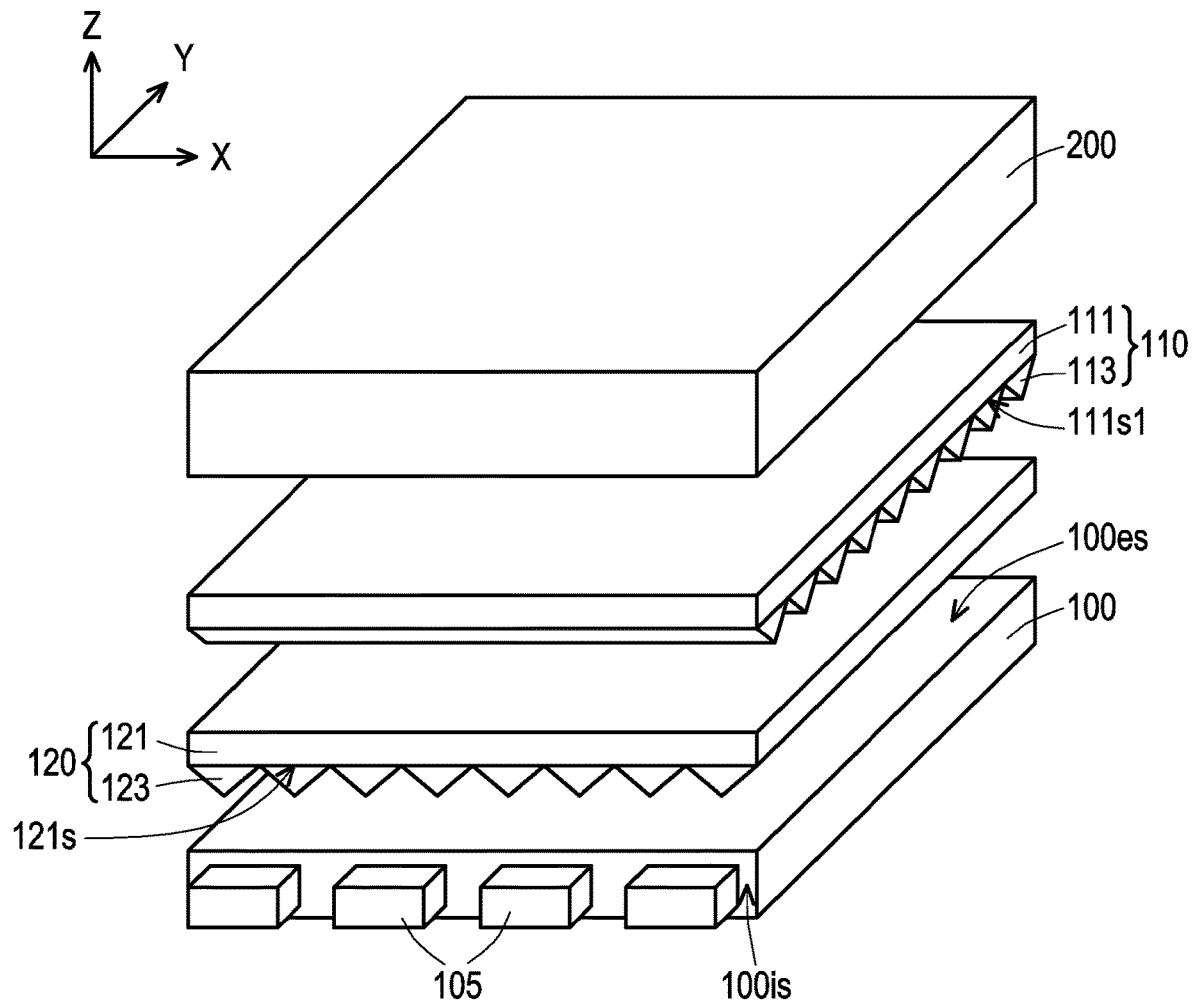
FIG. 1 is a schematic view of a display apparatus according to an embodiment of the disclosure.
Figure 2:
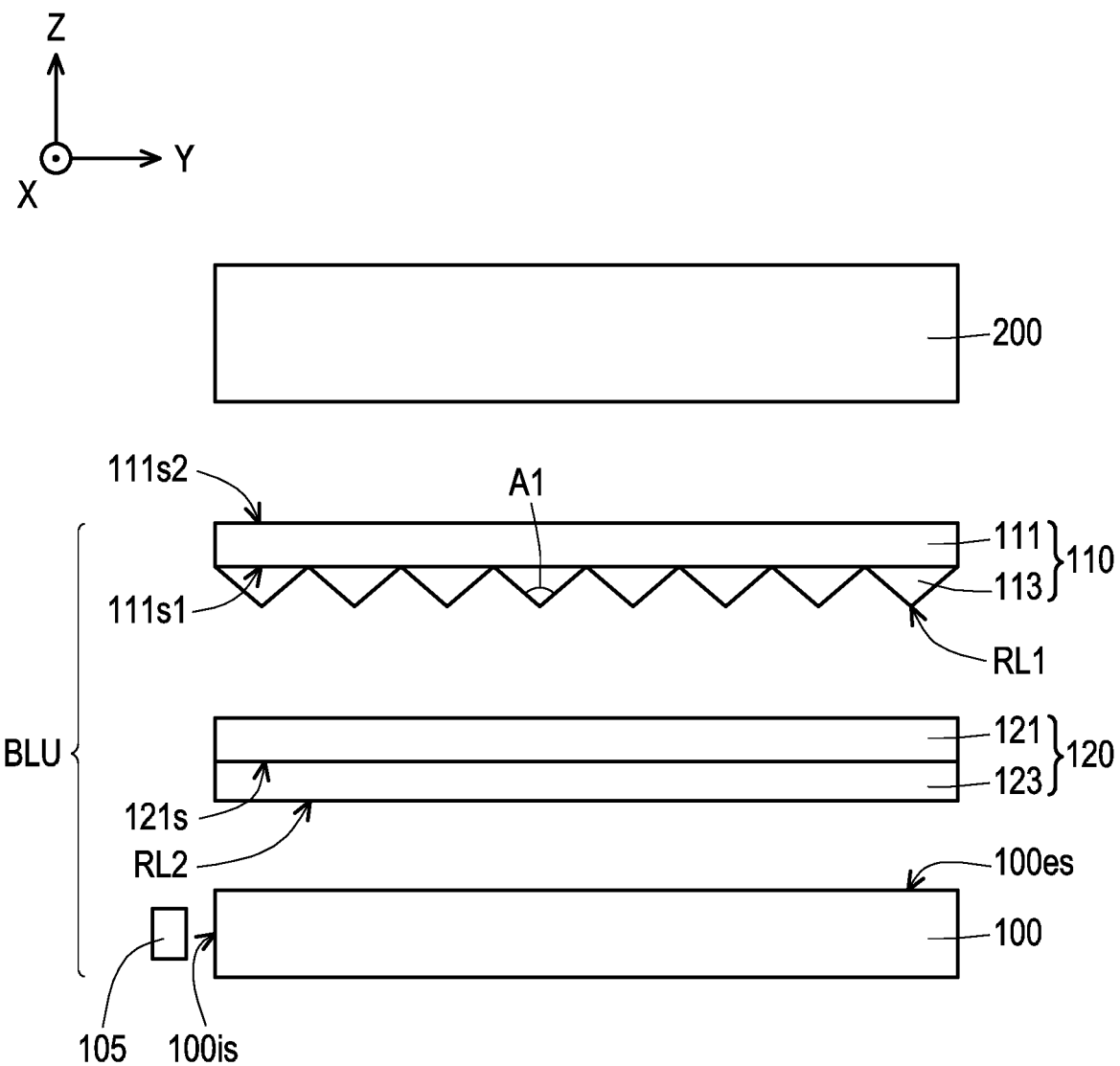
FIG. 2 is a schematic cross-sectional view of the display apparatus in FIG. 1 on a YZ plane.
Figure 3:
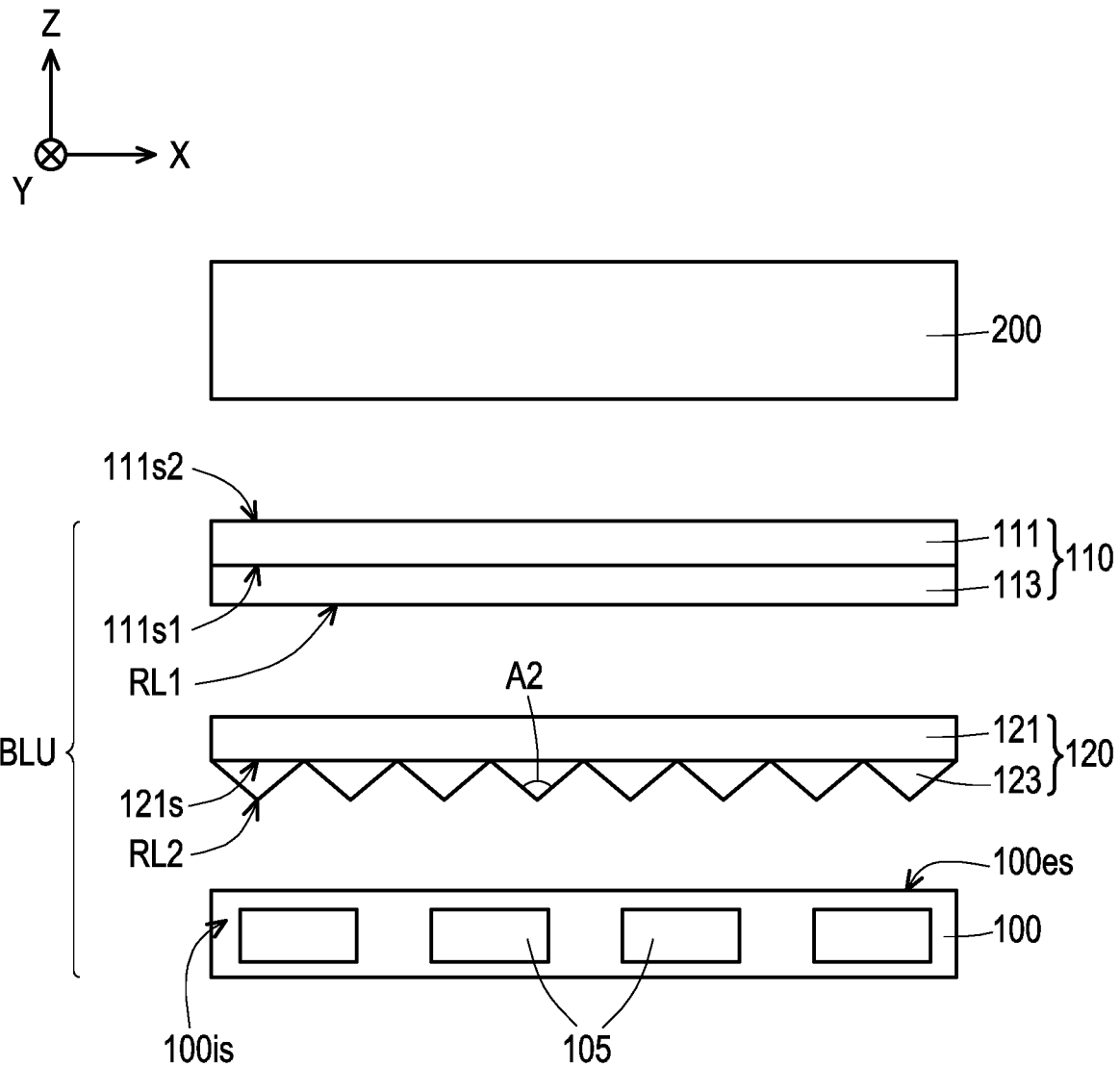
FIG. 3 is a schematic cross-sectional view of the display apparatus in FIG. 1 on an XZ plane.
Figure 4:
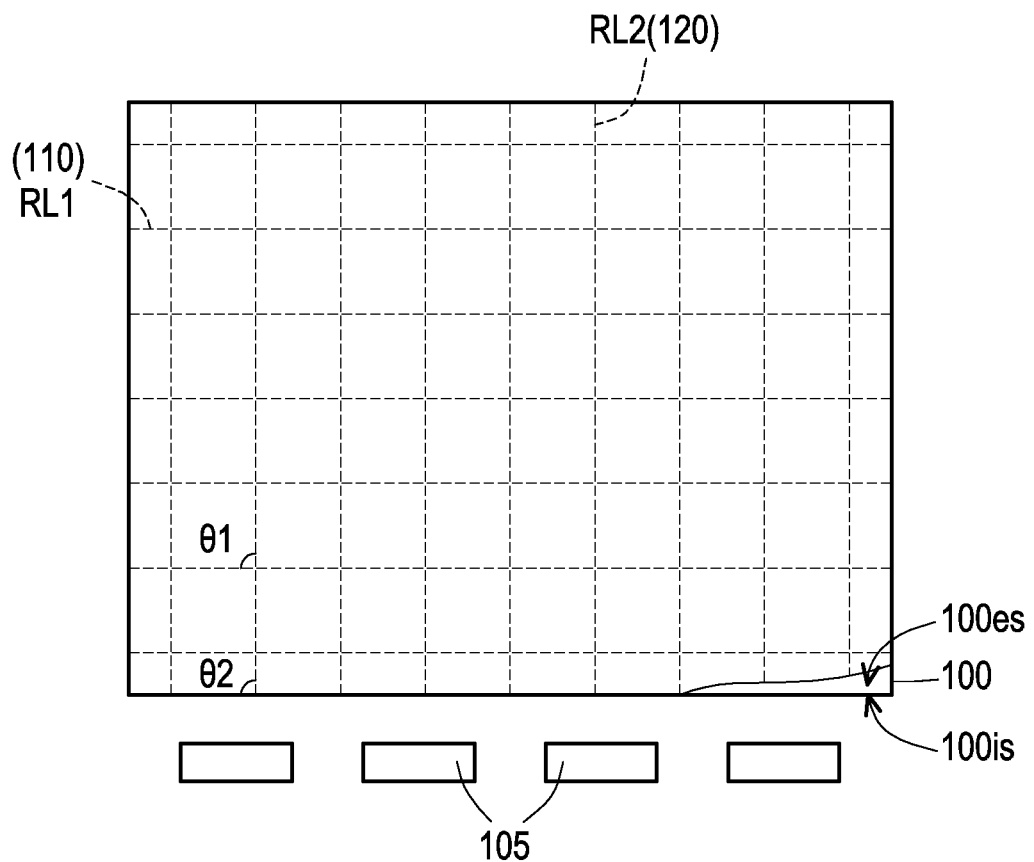
FIG. 4 is a schematic top view of a backlight module in FIG. 1.
Figure 5A:
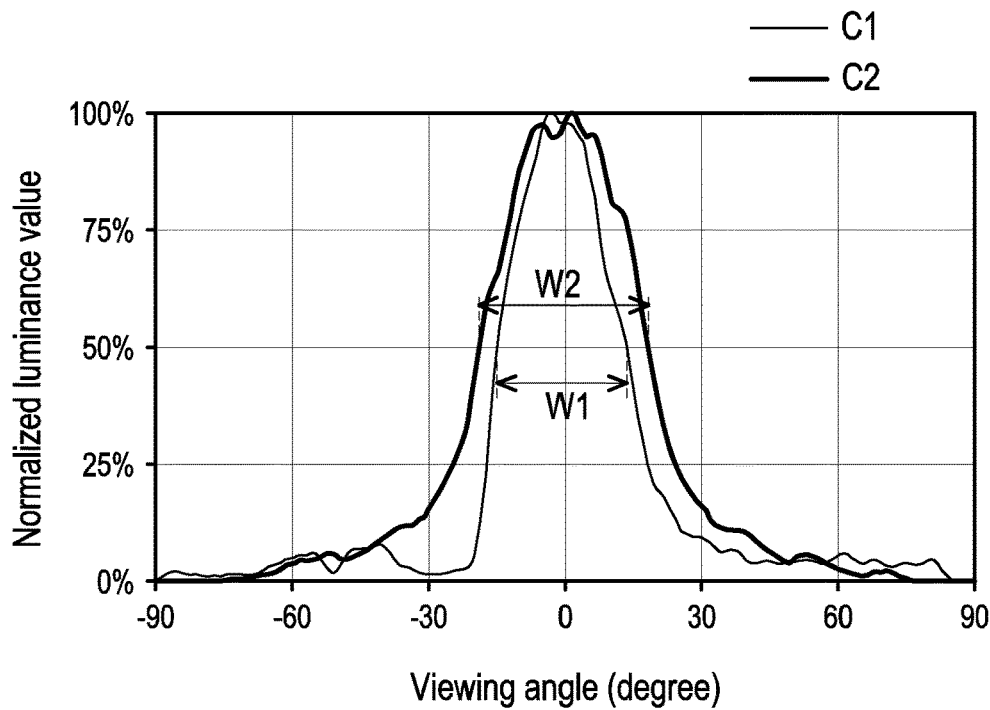
FIG. 5A is a distribution of light exiting luminance of the backlight module in FIG. 1 in two directions perpendicular to each other.
Figure 5B:
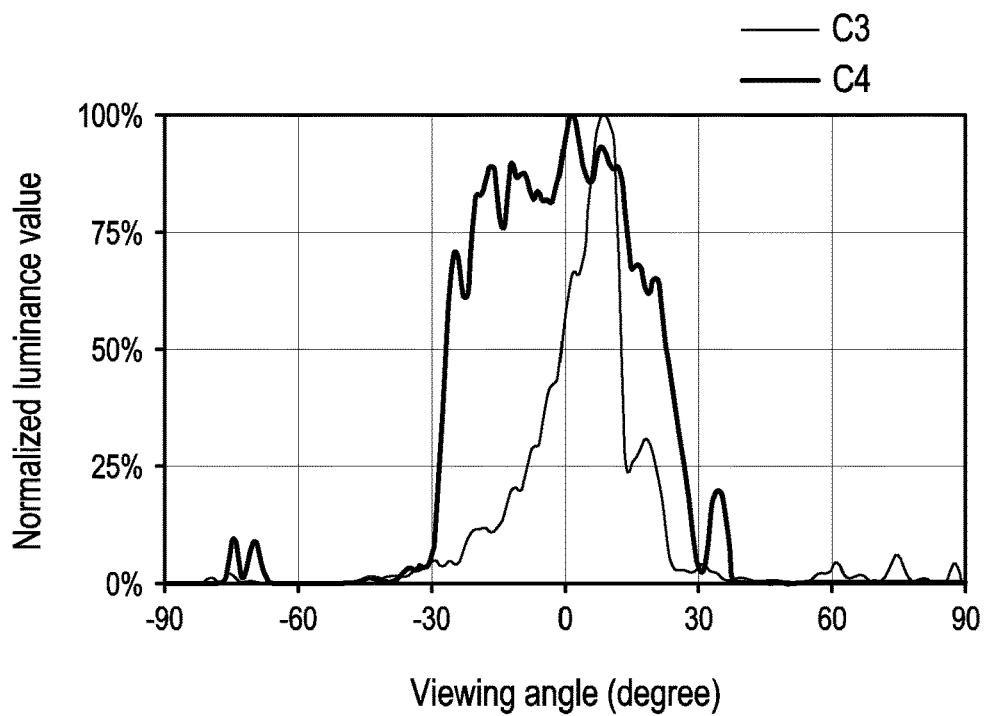
FIG. 5B is a distribution of light exiting luminance of the backlight module of a comparative example in two directions perpendicular to each other.

FIG. 1 is a schematic view of a display apparatus according to an embodiment of the disclosure. FIG. 2 is a schematic cross-sectional view of the display apparatus in FIG. 1 on a YZ plane. FIG. 3 is a schematic cross-sectional view of the display apparatus in FIG. 1 on an XZ plane. FIG. 4 is a schematic top view of a backlight module in FIG. 1. FIG. 5A is a distribution of light exiting luminance of the backlight module in FIG. 1 in two directions perpendicular to each other. FIG. 5B is a distribution of light exiting luminance of the backlight module of a comparative example in two directions perpendicular to each other. In particular, the two directions in FIG. 5A and FIG. 5B are, for example, a direction X and a direction Y in FIG. 1.

Please refer to FIG. 1 to FIG. 4. A display apparatus 10 includes a backlight module BLU and a display panel 200. The backlight module BLU includes a light guide plate 100, a light source 105, a first prism sheet 110, and a second prism sheet 120. The light guide plate 100 has a light incident surface 100is and a light exiting surface 100es connected to the light incident surface 100is. The light source 105 is disposed on a side of the light incident surface 100is of the light guide plate 100. The first prism sheet 110 is disposed on a side of the light exiting surface 100es of the light guide plate 100 and overlaps the light exiting surface 100es. The second prism sheet 120 is disposed between the first prism sheet 110 and the light guide plate 100, and overlaps the light exiting surface 100es of the light guide plate 100. The display panel 200 is disposed on a side of the first prism sheet 110 away from the second prism sheet 120 and overlaps the light exiting surface 100es of the light guide plate 100. The display panel 200 is, for example, a liquid crystal display panel, or other suitable non-self-luminous display panels.

It should be noted that an overlapping relationship here means, for example, that two components overlap each other along a normal direction (e.g., a direction Z) of the light exiting surface 100es of the light guide plate 100. If not specifically mentioned below, the overlapping relationship of the two components is defined in the same manner, and will not be repeated here.

In detail, the first prism sheet 110 has a first substrate 111 and multiple first prism structures 113. The first substrate 111 has a surface 111s1 (i.e., a first surface) and a surface 111s2 which are away from each other. The first prism structures 113 are disposed on the surface 111s1 of the first substrate 111 facing the light guide plate 100. The second prism sheet 120 has a second substrate 121 and multiple second prism structures 123. The second prism structures 123 are disposed on a surface 121s (i.e., a second surface) of the second substrate 121 facing the light guide plate 100. A material of the first substrate 111 and the second substrate 121 may include polyethylene terephthalate (PET) and polycarbonate (PC). A material of the first prism structure 113 and the second prism structure 123 may include UV glue or other suitable polymers.

An included angle θ1 between an extending direction of the multiple first prism structures 113 of the first prism sheet 110 and an extending direction of the multiple second prism structures 123 of the second prism sheet 120 is greater than or equal to 85 degrees and less than or equal to 95 degrees. In this embodiment, the multiple first prism structures 113 are, for example, arranged along the direction Y and extend in the direction X, and the multiple second prism structures 123 are, for example, arranged along the direction X and extend in the direction Y.

The extending direction of the prism structure mentioned herein is defined by a direction of a ridgeline of the prism structure on a side away from the substrate. For example, a direction of a first ridgeline RL1 of the first prism structure 113 away from a side of the first substrate 111 may define the extending direction of the first prism structure 113, a direction of a second ridgeline RL2 of the second prism structure 123 on a side away from the second substrate 121 may define the extending direction of the second prism structure 123 (as shown in FIG. 4), but is not limited thereto. On the other hand, an included angle θ2 between the extending direction of the multiple second prism structures 123 of the second prism sheet 120 closer to the light guide plate 100 and the light incident surface 100is of the light guide plate 100 is greater than or equal to 85 degrees and less than or equal to 95 degrees.

Through the configuration relationship between the first prism sheet 110, the second prism sheet 120, and the light incident surface 100is of the light guide plate 100, the light leakage phenomenon of the backlight module BLU at large viewing angles can be effectively improved, and the light exiting luminance near the normal viewing angle can be improved. For example, in this embodiment, the extending direction of the multiple first prism structures 113 of the first prism sheet 110 may be perpendicular to the extending direction of the multiple second prism structures 123 of the second prism sheet 120, and the extending direction of these second prism structures 123 may be perpendicular to the light incident surface 100is of the light guide plate 100.

Further, each of the multiple first prism structures 113 has a first vertex angle A1 away from the first substrate 111 (as shown in FIG. 2), and the first vertex angle A1 is greater than or equal to 50 degrees and less than or equal to 70 degrees. Each of the multiple second prism structures 123 has a second vertex angle A2 away from the second substrate 121 (as shown in FIG. 3), and the second vertex angle A2 is greater than or equal to 45 degrees and less than or equal to 65 degrees.

Through the limitation of the above-mentioned angle range, the light leakage of large viewing angles can be concentrated near the normal viewing angle, and the symmetry of the light emission type of the backlight module BLU with respect to the normal viewing angle (i.e., the viewing angle of 0 degrees) can be improved.

Curve C1 of FIG. 5A illustrates the change of a normalized luminance value of the backlight module BLU versus the viewing angle along the direction Y in FIG. 1, while curve C2 illustrates the change of a normalized luminance value of the backlight module BLU versus the viewing angle along the direction X in FIG. 1. Curve C3 in FIG. 5B illustrates the change of a normalized luminance value of the backlight module of the comparative example versus the viewing angle along a direction similar to the direction Y in FIG. 1, and curve C4 illustrates the change of a normalized luminance value of the backlight module of the comparative example versus the viewing angle along a direction similar to the direction X in FIG. 1.

It should be noted that the normalized luminance value here is, for example, a percentage value of light exiting luminance of the backlight module at any viewing angle in a single direction (or an azimuth) to a maximum light exiting luminance of the backlight module. In addition, in the backlight module (not illustrated) as the comparative example here, the first prism structure of the first prism sheet is disposed on a side surface of the first substrate away from the light guide plate, and an included angle between an extending direction thereof and the light incident surface is, for example, 31 degrees. The second prism structure of the second prism sheet is disposed on a side surface of the second substrate away from the light guide plate, and an included angle between an extending direction thereof and the light incident surface is, for example, 121 degrees.

It may be known from FIG. 5A and FIG. 5B that, no matter in which direction, the change of the light exiting luminance of the backlight module BLU of this embodiment from the normal viewing angle to the side viewing angle is more moderate than the comparative example in FIG. 5B, and the symmetry of the light emission type is also better. Therefore, the visual variability of the display apparatus 10 near the normal viewing angle can be significantly improved, thereby improving the display quality.

In this embodiment, the first vertex angle A1 of the first prism structure 113 and the second vertex angle A2 of the second prism structure 123 are limited within the above-mentioned angle range, so that the backlight module BLU may generate an additional 15% to 90% luminance gain comparing with the backlight module in the comparative example. In a preferred embodiment, the first vertex angle A1 of the first prism structure 113 of the first prism sheet 110 may be greater than the second vertex angle A2 of the second prism structure 123 of the second prism sheet 120, so that the backlight module BLU may have a better luminance gain effect near the normal viewing angle.

Please continue to refer to FIG. 5A. The backlight module BLU of this embodiment has a light exiting angle range (or a viewing angle range) including a normal angle (i.e., a viewing angle of 0 degrees) and a maximum light exiting luminance within the light exiting angle range, in which a percentage value of the light exiting luminance of any viewing angle to the maximum light exiting luminance within the light exiting angle range is greater than or equal to 50%. It should be particularly noted that a width W1 of the light exiting angle range along a normal direction (for example, the direction Y) of the light incident surface 100is in FIG. 1 is greater than 20 degrees and less than 30 degrees, and a width W2 along a direction (for example, the direction X) parallel to the light incident surface 100is and the light exiting surface 100es is greater than 30 degrees and less than 39 degrees. Preferably, a ratio of the width W1 to the width W2 of the light exiting angle range is greater than 0.5128 and less than 1.

Another embodiment will be listed below to describe the disclosure in detail, in which the same components will be marked with the same symbols, and the description of the same technical content will be omitted.

Figure 6:
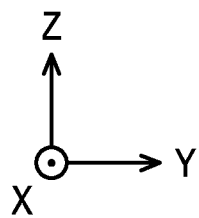
FIG. 6 is a schematic cross-sectional view of a backlight module according to another embodiment of the disclosure.
Figure 6:
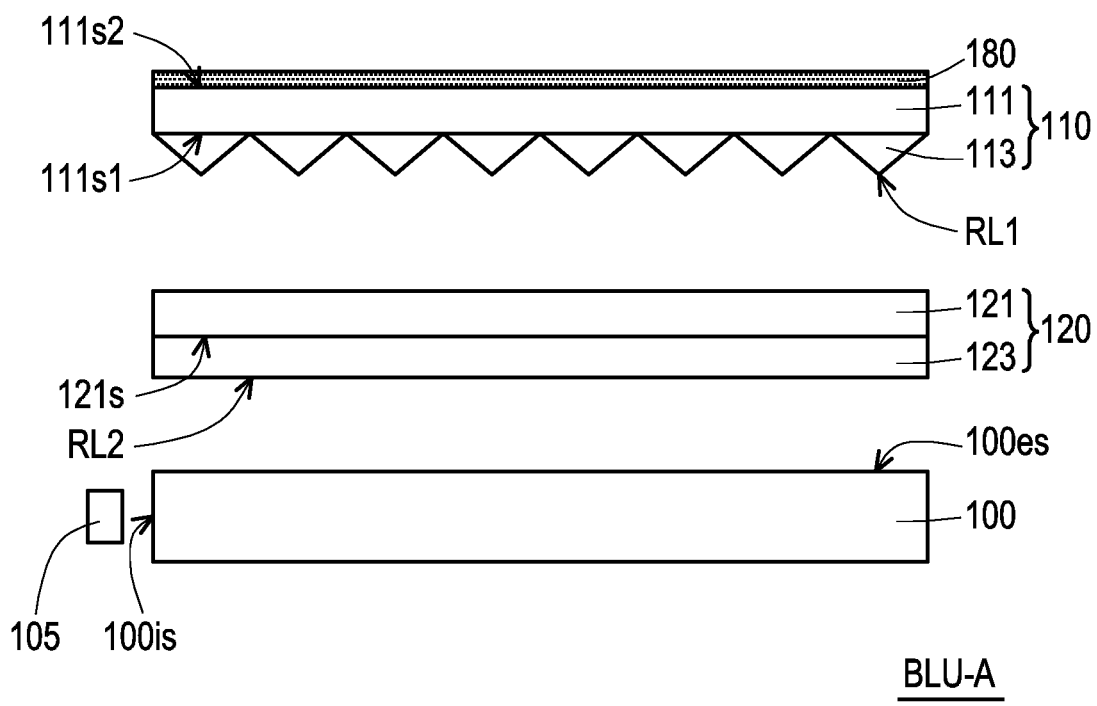

FIG. 6 is a schematic cross-sectional view of a backlight module according to another embodiment of the disclosure. Please refer to FIG. 6. The difference between a backlight module BLU-A of this embodiment and the backlight module BLU in FIG. 2 is that the backlight module BLU-A may optionally include a diffusion layer 180, disposed on the surface 111s2 (i.e., a third surface) of the first substrate 111 of the first prism sheet 110 and away from the multiple first prism structures 113 and overlapping the multiple first prism structures 113. That is, the diffusion layer 180 is positioned on the side of the first prism sheet 110 away from the light guide plate 100.

Through the configuration of the diffusion layer 180, the concealing ability of the backlight module BLU-A on fine defects can be further improved. Preferably, a haze value of the diffusion layer 180 may be greater than or equal to 30% and less than or equal to 60%.

Figure 7:
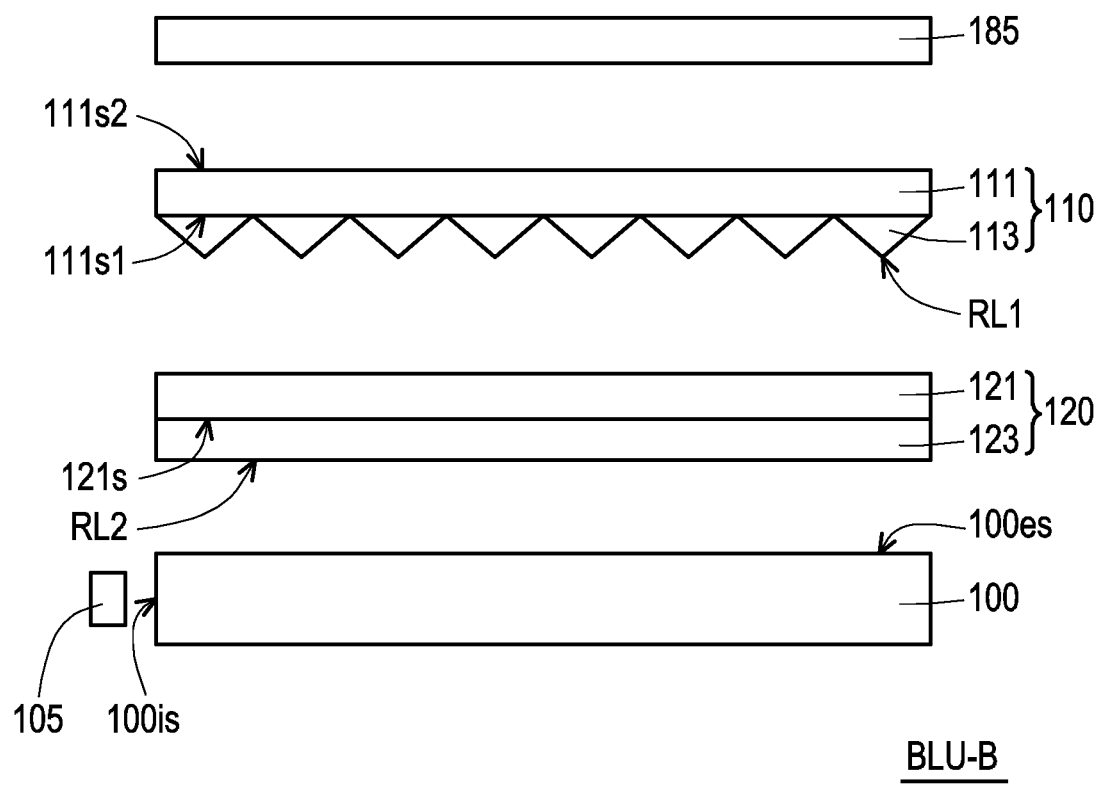
FIG. 7 is a schematic cross-sectional view of a backlight module according to still another embodiment of the disclosure.

FIG. 7 is a schematic cross-sectional view of a backlight module according to still another embodiment of the disclosure. Please refer to FIG. 7. The difference between a backlight module BLU-B of this embodiment and the backlight module BLU in FIG. 2 is that the backlight module BLU-B may optionally include a diffuser 185, disposed on a side of the first substrate 111 of the first prism sheet 110 away from the multiple first prism structures 113 and overlapping the multiple first prism structures 113. That is, the diffuser 185 is positioned on the side of the first prism sheet 110 away from the light guide plate 100.

Through the configuration of the diffuser 185, the concealing ability of the backlight module BLU-B on fine defects can be further improved. Preferably, a haze value of the diffuser 185 may be greater than or equal to 30% and less than or equal to 60%.

In particular, the backlight module BLU of the display apparatus 10 in FIG. 1 may be replaced by the backlight module BLU-A or the backlight module BLU-B to meet different application or design requirements.

In summary, in the backlight module and the display apparatus of an embodiment of the disclosure, the multiple first prism structures of the first prism sheet and the multiple second prism structures of the second prism sheet are disposed facing the light exiting surface of the light guide plate. The included angle between the extending direction of the first prism structure and the extending direction of the second prism structure is in the range of 85 degrees to 95 degrees. The included angle between the extending direction of the second prism structure between the first prism sheet and the light guide plate and the light incident surface is in the range of 85 degrees to 95 degrees. Accordingly, the light leakage phenomenon at large viewing angles can be suppressed, and the symmetry of the light emission type of the backlight module with respect to the normal viewing angle can be effectively improved. In addition, the light exiting luminance variation of the backlight module near the normal viewing angle is moderate, which helps to improve the visual variability of the display apparatus near the normal viewing angle, thereby improving the display quality.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from the disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A backlight module, comprising:
   a light guide plate having a light incident surface and a light exiting surface connected to the light incident surface;
   a light source disposed on a side of the light incident surface of the light guide plate;
   a first prism sheet disposed on a side of the light exiting surface of the light guide plate, the first prism sheet has a first substrate and a plurality of first prism structures, and the plurality of first prism structures are disposed on a first surface of the first substrate facing the light guide plate, wherein each of the plurality of first prism structures has a first vertex angle away from the first substrate, and the first vertex angle is greater than or equal to 50 degrees and less than or equal to 70 degrees; and
   a second prism sheet disposed between the first prism sheet and the light guide plate, the second prism sheet has a second substrate and a plurality of second prism structures, the plurality of second prism structures are disposed on a second surface of the second substrate facing the light guide plate, wherein an included angle between an extending direction of the plurality of first prism structures and an extending direction of the plurality of second prism structures is greater than or equal to 85 degrees and less than or equal to 95 degrees, an included angle between the extending direction of the plurality of second prism structures of the second prism sheet and the light incident surface is greater than or equal to 85 degrees and less than or equal to 95 degrees, and each of the plurality of second prism structures has a second vertex angle away from the second substrate, and the second vertex angle is greater than or equal to 45 degrees and less than or equal to 65 degrees.

2. The backlight module according to claim 1, wherein the first vertex angle of each of the first prism structures is greater than the second vertex angle of each of the second prism structures.

3. A backlight module comprising:
a light guide plate having a light incident surface and a light exiting surface connected to the light incident surface;
a light source disposed on a side of the light incident surface of the light guide plate;
a first prism sheet disposed on a side of the light exiting surface of the light guide plate, the first prism sheet has a first substrate and a plurality of first prism structures, and the plurality of first prism structures are disposed on a first surface of the first substrate facing the light guide plate;
a second prism sheet disposed between the first prism sheet and the light guide plate, the second prism sheet has a second substrate and a plurality of second prism structures, the plurality of second prism structures are disposed on a second surface of the second substrate facing the light guide plate, wherein an included angle between an extending direction of the plurality of first prism structures and an extending direction of the plurality of second prism structures is greater than or equal to 85 degrees and less than or equal to 95 degrees, and an included angle between the extending direction of the plurality of second prism structures of the second prism sheet and the light incident surface is greater than or equal to 85 degrees and less than or equal to 95 degrees; and
a diffuser, disposed on a side of the first substrate of the first prism sheet away from the plurality of first prism structures, and overlapping the first prism sheet.

4. The backlight module according to claim 3, wherein a haze value of the diffuser is greater than or equal to 30% and less than or equal to 60%.

5. A backlight module comprising:
a light guide plate having a light incident surface and a light exiting surface connected to the light incident surface;
a light source disposed on a side of the light incident surface of the light guide plate;
a first prism sheet disposed on a side of the light exiting surface of the light guide plate, the first prism sheet has a first substrate and a plurality of first prism structures, and the plurality of first prism structures are disposed on a first surface of the first substrate facing the light guide plate;
a second prism sheet disposed between the first prism sheet and the light guide plate, the second prism sheet has a second substrate and a plurality of second prism structures, the plurality of second prism structures are disposed on a second surface of the second substrate facing the light guide plate, wherein an included angle between an extending direction of the plurality of first prism structures and an extending direction of the plurality of second prism structures is greater than or equal to 85 degrees and less than or equal to 95 degrees, and an included angle between the extending direction of the plurality of second prism structures of the second prism sheet and the light incident surface is greater than or equal to 85 degrees and less than or equal to 95 degrees; and
a diffusion layer, disposed on a third surface of the first substrate of the first prism sheet away from the plurality of first prism structures.

6. The backlight module according to claim 5, wherein a haze value of the diffusion layer is greater than or equal to 30% and less than or equal to 60%.

7. A backlight module, comprising:
a light guide plate having a light incident surface and a light exiting surface connected to the light incident surface;
a light source disposed on a side of the light incident surface of the light guide plate;
a first prism sheet disposed on a side of the light exiting surface of the light guide plate, the first prism sheet has a first substrate and a plurality of first prism structures, and the plurality of first prism structures are disposed on a first surface of the first substrate facing the light guide plate; and
a second prism sheet disposed between the first prism sheet and the light guide plate, the second prism sheet has a second substrate and a plurality of second prism structures, the plurality of second prism structures are disposed on a second surface of the second substrate facing the light guide plate, wherein an included angle between an extending direction of the plurality of first prism structures and an extending direction of the plurality of second prism structures is greater than or equal to 85 degrees and less than or equal to 95 degrees, and an included angle between the extending direction of the plurality of second prism structures of the second prism sheet and the light incident surface is greater than or equal to 85 degrees and less than or equal to 95 degrees,
wherein the backlight module has a light exiting angle range comprising a normal angle and a maximum light exiting luminance within the light exiting angle range, a percentage value of the light exiting luminance to the maximum light exiting luminance within the light exiting angle range is greater than or equal to 50%, a width of the light exiting angle range along a normal direction of the light incident surface is greater than 20 degrees and less than 30 degrees, and a width of the light exiting angle range along a direction parallel to the light incident surface and the light exiting surface is greater than 30 degrees and less than 39 degrees.

8. The backlight module according to claim 7, wherein a ratio of the width of the light exiting angle range along the normal direction of the light incident surface to the width of the light exiting angle range along the direction parallel to the light incident surface and the light exiting surface is greater than 0.5128 and less than 1.

9. A display apparatus, comprising:
a backlight module, comprising:
a light guide plate having a light incident surface and a light exiting surface connected to the light incident surface;
a light source disposed on a side of the light incident surface of the light guide plate;
a first prism sheet disposed on a side of the light exiting surface of the light guide plate, the first prism sheet has a first substrate and a plurality of first prism structures, and the plurality of first prism structures are disposed on a first surface of the first substrate facing the light guide plate, wherein each of the plurality of first prism structures has a first vertex angle away from the first substrate, and the first vertex angle is greater than or equal to 50 degrees and less than or equal to 70 degrees; and
a second prism sheet disposed between the first prism sheet and the light guide plate, the second prism sheet has a second substrate and a plurality of second prism structures, the plurality of second prism structures are disposed on a second surface of the second substrate facing the light guide plate, wherein an included angle between an extending direction of the plurality of first prism structures and an extending direction of the plurality of second prism structures is greater than or equal to 85 degrees and less than or equal to 95 degrees, an included angle between the extending direction of the plurality of second prism structures of the second prism sheet and the light incident surface is greater than or equal to 85 degrees and less than or equal to 95 degrees, and each of the plurality of second prism structures has a second vertex angle away from the second substrate, and the second vertex angle is greater than or equal to 45 degrees and less than or equal to 65 degrees; and a display panel disposed on a side of the first prism sheet away from the second prism sheet and overlapping the light exiting surface of the light guide plate.

\* \* \* \* \*